United States Patent
Kim

(10) Patent No.: US 11,928,056 B2
(45) Date of Patent: Mar. 12, 2024

(54) MEMORY CONTROLLER FOR ALLOCATING CACHE LINES AND METHOD OF OPERATING THE SAME

(71) Applicant: SK hynix Inc., Icheon (KR)

(72) Inventor: Do Hun Kim, Icheon (KR)

(73) Assignee: SK hynix Inc., Icheon (KR)

(*) Notice: Subject to any disclaimer, the term of this patent is extended or adjusted under 35 U.S.C. 154(b) by 290 days.

(21) Appl. No.: 17/180,531

(22) Filed: Feb. 19, 2021

(65) Prior Publication Data

US 2022/0058120 A1    Feb. 24, 2022

(30) Foreign Application Priority Data

Aug. 21, 2020   (KR) .................. 10-2020-0105641

(51) Int. Cl.
*G06F 12/06* (2006.01)
*G06F 13/28* (2006.01)

(52) U.S. Cl.
CPC .......... *G06F 12/0646* (2013.01); *G06F 13/28* (2013.01); *G06F 2212/608* (2013.01)

(58) Field of Classification Search
CPC ................................................. G06F 12/0646
USPC ....................................................... 711/170
See application file for complete search history.

(56) References Cited

U.S. PATENT DOCUMENTS

| | | | | | |
|---|---|---|---|---|---|
| 5,802,576 | A * | 9/1998 | Tzeng | ................. | G06F 12/0835 711/146 |
| 5,966,734 | A * | 10/1999 | Mohamed | ........... | G06F 12/0897 711/170 |
| 6,041,397 | A * | 3/2000 | Rickard | ................ | G06F 12/023 711/170 |
| 6,295,608 | B1 * | 9/2001 | Parkes | ................ | G06F 11/3466 707/999.203 |
| 6,680,915 | B1 * | 1/2004 | Park | ....................... | G06F 15/16 370/254 |
| 7,958,311 | B2 * | 6/2011 | Matick | .................. | G06F 12/127 711/134 |
| 8,285,941 | B2 * | 10/2012 | Ekanadham | ........ | G06F 12/0862 711/E12.01 |
| 2006/0112235 | A1* | 5/2006 | Cabot | ................. | G06F 12/0879 711/E12.053 |
| 2009/0132768 | A1* | 5/2009 | Jones | .................. | G06F 12/0846 711/144 |
| 2009/0198912 | A1* | 8/2009 | Arimilli | .............. | G06F 12/0815 711/E12.001 |
| 2010/0293420 | A1* | 11/2010 | Kapil | .................. | G06F 12/0815 711/135 |

(Continued)

FOREIGN PATENT DOCUMENTS

| KR | 10-2010-0075670 A | 7/2010 |
|---|---|---|
| KR | 10-2013-0009927 A | 1/2013 |

(Continued)

*Primary Examiner* — Titus Wong

(57) ABSTRACT

The present technology relates to an electronic device. A memory controller that increases a hit ratio of a cache memory includes a memory buffer configured to store command data corresponding to a request received from a host, and a cache memory configured to cache the command data. The cache memory stores the command data by allocating cache lines based on a component that outputs the command data and a flag included in the command data.

12 Claims, 14 Drawing Sheets

(56) References Cited

U.S. PATENT DOCUMENTS

| | | | |
|---|---|---|---|
| 2010/0306417 A1* | 12/2010 | Stephens | G06F 13/1631 |
| | | | 710/5 |
| 2014/0095796 A1* | 4/2014 | Bell, Jr. | G06F 12/0855 |
| | | | 711/130 |
| 2015/0012690 A1* | 1/2015 | Bruce | G06F 12/0844 |
| | | | 711/103 |

FOREIGN PATENT DOCUMENTS

| KR | 10-2019-0058316 A | 5/2019 |
|---|---|---|
| KR | 10-2019-0086341 A | 7/2019 |

\* cited by examiner

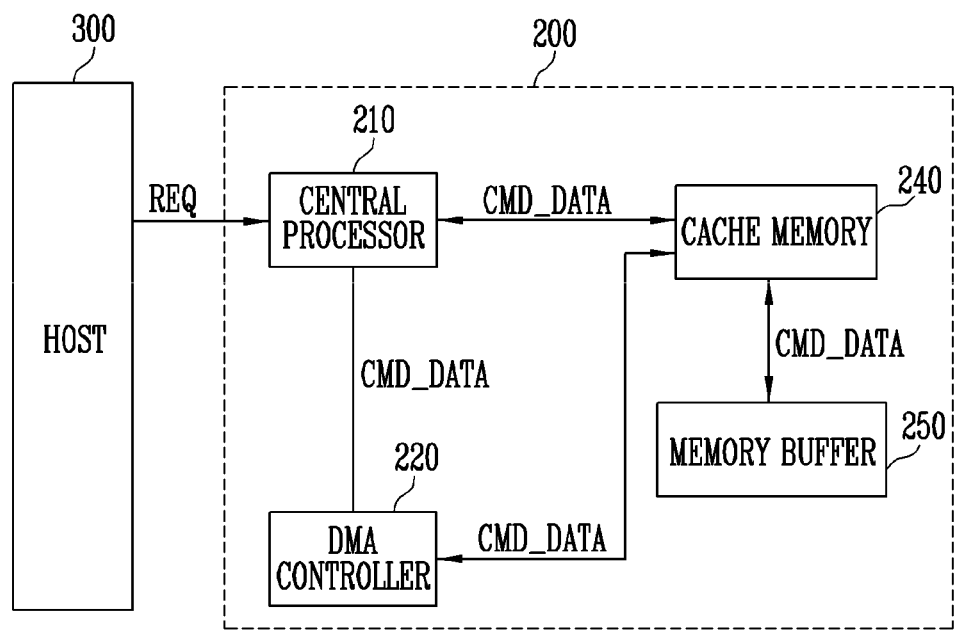

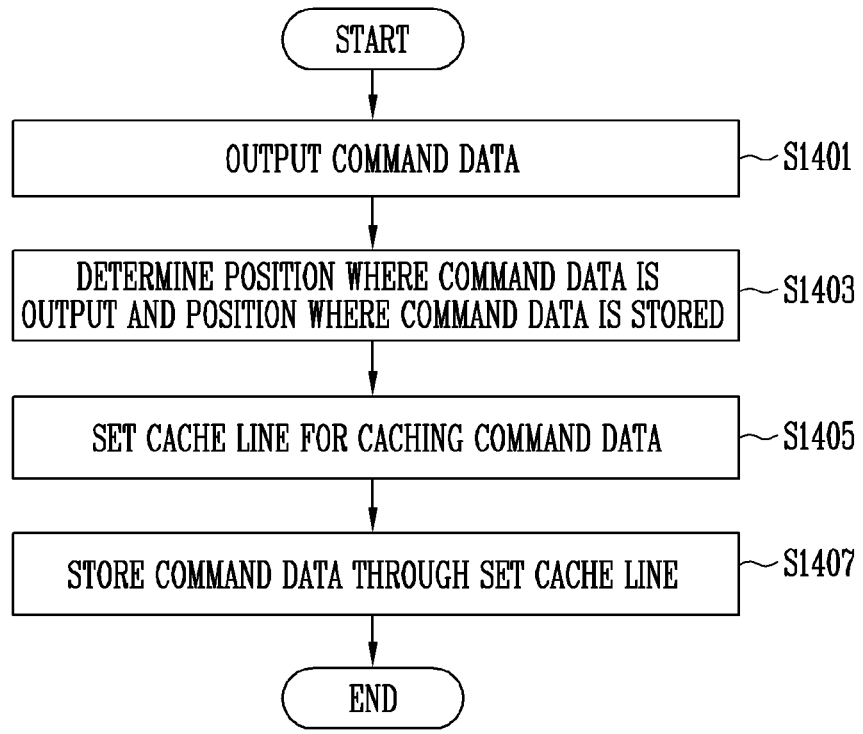
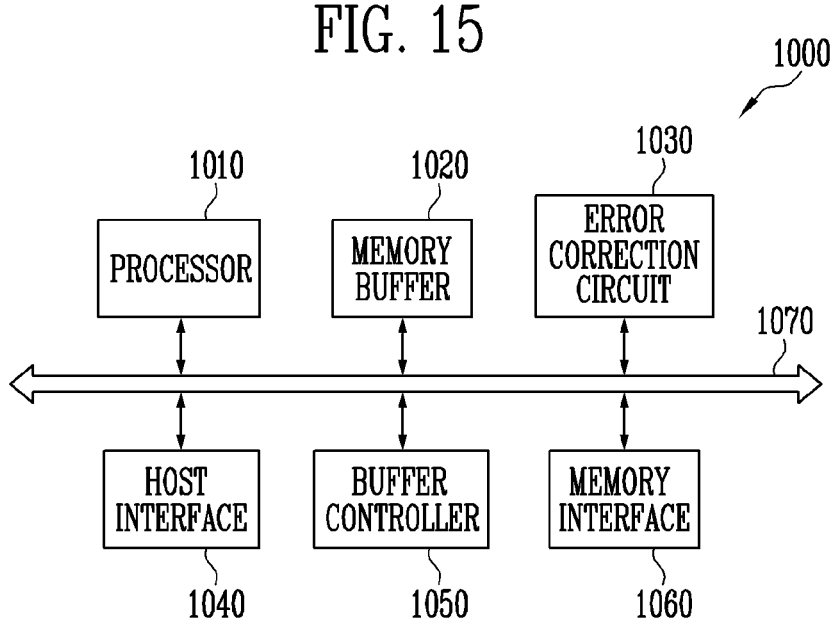

MEMORY CONTROLLER FOR ALLOCATING CACHE LINES AND METHOD OF OPERATING THE SAME

CROSS-REFERENCE TO RELATED APPLICATION

The present application claims priority under 35 U.S.C. § 119(a) to Korean patent application number 10-2020-0105641, filed on Aug. 21, 2020, in the Korean Intellectual Property Office, the entire disclosure of which is incorporated herein by reference.

BACKGROUND

1. Technical Field

The present disclosure relates to an electronic device, and more particularly, to a memory controller and a method of operating the same.

2. Related Art

A storage device is a device that stores data under the control of a host device such as a computer, a smart phone, or a smart pad. The storage device includes a device that stores data in a magnetic disk, such as a hard disk drive (HDD), a device that stores data in a semiconductor memory, e.g., a non-volatile memory, such as a solid state drive (SSD), or a memory card.

The storage device may include a memory device in which data is stored and a memory controller that stores data in the memory device. The memory device may be classified into a volatile memory and a non-volatile memory. Here, the non-volatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), or the like.

SUMMARY

An embodiment of the present disclosure provides a memory controller that allocates a cache line for transmitting map data or command data without additional information from the outside, and a method of operating the same.

A memory controller according to an embodiment of the present disclosure includes a memory buffer configured to store command data corresponding to a request received from a host and a cache memory configured to cache the command data. The cache memory stores the command data by allocating cache lines based on a component that outputs the command data and a flag included in the command data.

A method of operating a memory controller including a memory buffer and a cache memory according to an embodiment of the present disclosure includes storing command data corresponding to a request received from a host in the memory buffer, and caching the command data in the cache memory, and caching may include allocating cache lines based on a component that outputs the command data and a flag included in the command data.

According to the present technology, a hit rate of a cache memory may be increased by allocating cache lines for transmitting map data or command data through a method of accessing the map data or the command data.

BRIEF DESCRIPTION OF THE DRAWINGS

FIG. 9 is a diagram illustrating transmission of command data between components included in the memory controller.

FIG. 10 is a diagram illustrating a unit in which command data is flushed.

FIG. 14 is a diagram illustrating an operation of the memory controller according to an embodiment of the present disclosure.

FIG. 15 is a diagram illustrating the memory controller according to another embodiment.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, embodiments of the present disclosure will be described in detail with reference to the accompanying drawings, so that those skilled in the art to which the present disclosure pertains may easily carry out the technical spirit of the present disclosure.

Figure 1:
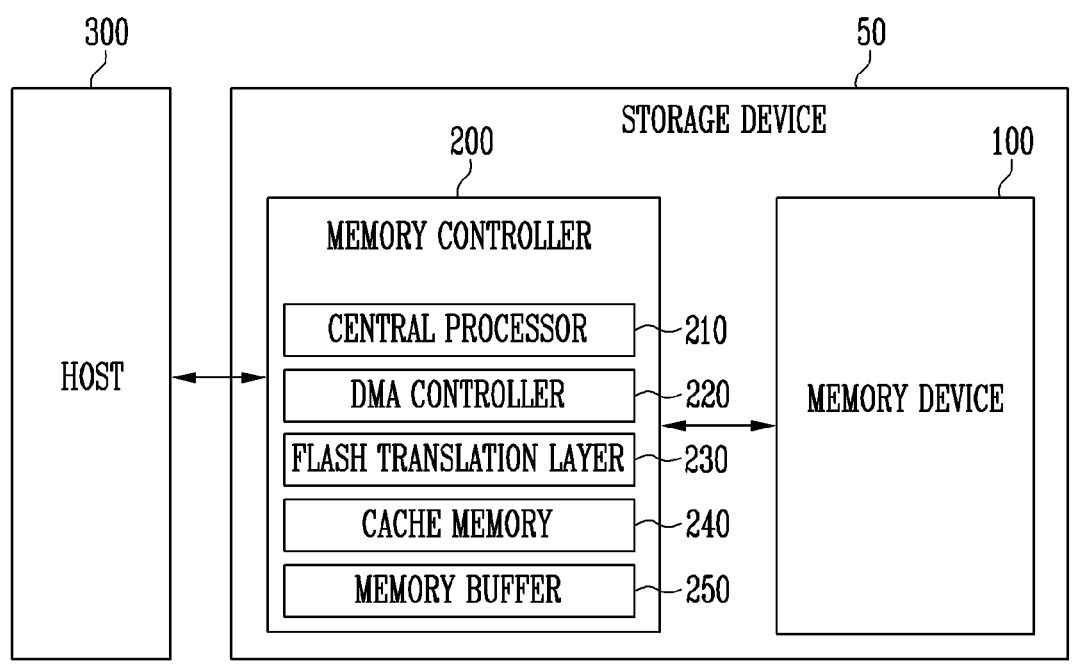
FIG. 1 is a block diagram illustrating a storage device according to an embodiment.

FIG. 1 is a block diagram illustrating a storage device 50 according to an embodiment.

Referring to FIG. 1, the storage device 50 may include a memory device 100 and a memory controller 200.

The storage device 50 may be a device that stores data under the control of a host 300 such as a cellular phone, a smartphone, an MP3 player, a laptop computer, a desktop computer, a game player, a TV, a tablet PC, an in-vehicle infotainment system, or the like.

The storage device 50 may be manufactured as one of various types of storage devices according to a host interface that is a communication method with the host 300. For example, the storage device 50 may be configured as any one of various types of storage devices such as an SSD, a multimedia card in a form of an MMC, an eMMC, an RS-MMC, a micro-MMC, or the like, a secure digital card in a form of an SD, a mini-SD, a micro-SD, or the like, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so on.

The storage device 50 may be manufactured as any one of various types of packages such as a package on package (POP), a system in package (SIP), a system on chip (SOC), a multi-chip package (MCP), a chip on board (COB), a wafer-level fabricated package (WFP), a wafer-level stack package (WSP), and so on.

The memory device 100 may store data. The memory device 100 operates in response to control of the memory controller 200. The memory device 100 may include a memory cell array including a plurality of memory cells storing the data. The memory cell array may include a plurality of memory blocks. Each of the memory blocks may include a plurality of memory cells, and the plurality of memory cells may configure a plurality of pages. In an embodiment, a page may be a unit for storing data in the memory device 100 or reading data stored in the memory device 100. A memory block may be a unit for erasing data stored in the memory device 100.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change RAM (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 may be implemented as a two-dimensional array structure or a three-dimensional array structure. Hereinafter, the three-dimensional array structure is described as an embodiment, but embodiments are not limited to the three-dimensional array structure. The present disclosure may be applied not only to a flash memory device in which a charge storage layer is configured of a conductive floating gate (FG), but also to a charge trap flash (CTF) in which the charge storage layer is configured of an insulating film.

In an embodiment, the memory device 100 may operate in a single level cell (SLC) method in which one bit of data is stored in one memory cell. Alternatively, the memory device 100 may operate in a method of storing at least two bits of data in one memory cell. For example, the memory device 100 may operate in a multi-level cell (MLC) method of storing two bits of data in one memory cell, a triple level cell (TLC) method of storing three bits of data in one memory cell, or a quadruple level cell (QLC) method of storing four bits of data in one memory cell.

The memory device 100 is configured to receive a command and an address from the memory controller 200 and access a region selected by the address in the memory cell array. That is, the memory device 100 may perform an operation corresponding to the command on the region selected by the address. For example, the memory device 100 may perform a write operation (or program operation), a read operation, or an erase operation according to the received command. For example, when a program command is received, the memory device 100 may program data to the region selected by the address. When a read command is received, the memory device 100 may read data from the region selected by the address. When an erase command is received, the memory device 100 may erase data stored in the region selected by the address.

The memory controller 200 may control an overall operation of the storage device 50.

When a power voltage is applied to the storage device 50, the memory controller 200 may execute firmware. When the memory device 100 is a flash memory device, the memory controller 200 may operate firmware such as a flash translation layer (FTL) for controlling communication between the host 300 and the memory device 100.

In an embodiment, the memory controller 200 may include firmware (not shown) that may receive write data and a logical block address (LBA) from the host 300 and translate the LBA into a physical block address (PBA) indicating an address of memory cells in which the write data is to be stored. In addition, the memory controller 200 may store a logical-physical address mapping table configuring a mapping relationship between the LBA and the PBA in a buffer memory.

The memory controller 200 may control the memory device 100 to perform the program operation, the read operation, the erase operation, or the like according to a request of the host 300. For example, when a program request is received from the host 300, the memory controller 200 may converts the program request into a program command, and may provide the program command, the PBA, and the write data to the memory device 100. When a read request is received from the host 300 together with the LBA, the memory controller 200 may change the read request into a read command, select a PBA corresponding to the LBA, and then provide the read command and the PBA to the memory device 100. When an erase request is received from the host 300 together with the LBA, the memory controller 200 may change the erase request into an erase command, select a PBA corresponding to the LBA, and then provide the erase command and the PBA to the memory device 100.

In an embodiment, the memory controller 200 may generate and transmit a command, an address, and data to the memory device 100 without a request from the host 300. For example, the memory controller 200 may provide the command, the address, and the data to the memory device 100 so as to perform background operations such as a program operation for wear leveling and a program operation for garbage collection.

In an embodiment, the memory controller 200 may include a central processor 210. The central processor 210 may perform an operation for performing an operation corresponding to a request received from the host 300.

For example, when the request received from the host 300 is the program request, the central processor 210 may instruct to convert an LBA corresponding to the program request received from the host 300 into a PBA and output the converted PBA to the memory device 100. In addition, the central processor 210 may output data to be programmed to the memory device 100.

For another example, when the request received from the host 300 is the read request, the central processor 210 may instruct to convert an LBA corresponding to the read request received from the host 300 to a PBA and output the converted PBA to the memory device 100.

In addition, the central processor 210 may generate a command corresponding to the request received from the host 300. At this time, the central processor 210 may output command data corresponding to the command.

In an embodiment, the memory controller 200 may include a direct memory access (DMA) controller 220. The DMA controller 220 may control the memory controller 200 and the memory device 100 so that an operation is performed using a DMA method.

For example, the DMA controller 220 may control the memory device 100 so that the memory device 100 and the memory controller 200 communicate through an input/output pad without intervention of the central processor 210. At this time, since the DMA controller 220 may use a bus that connects to other components in the memory controller 200 while the central processor 210 does not access a memory buffer 250, the DMA controller 220 may control the memory device 100 without the intervention of the central processor 210.

In an embodiment, the memory controller 200 may include a flash translation layer 230. The flash translation layer 230 may generate map data representing a mapping relationship between an LBA and a PBA. In addition, the flash translation layer 230 may store a logical-physical address mapping table, which is generated based on the map data, in the memory buffer 250.

In an embodiment, the memory controller 200 may include a cache memory 240. The cache memory 240 may temporarily store the map data output from the flash translation layer 230, or temporarily store the map data or the command data received from the central processor 210. The cache memory 240 may output the temporarily stored map data or command data to the memory buffer 250. In addition, the cache memory 240 may temporarily store the map data or the command data output from the memory buffer 250, and may output the temporarily stored map data or command data to the central processor 210 or the DMA controller 220.

Furthermore, the cache memory 240 may cache the received map data or command data based on a locality. The locality may mean that the map data or command data has a high possibility to be referred again, and may be any one of a temporal locality and a spatial locality. The temporal locality indicates frequent access to map data MAP_DATA corresponding to previously referred data, and the spatial locality is spatial proximity to an address of a memory region where the previously referred data is stored. In addition, the map data or command data cached in the cache memory 240 may be updated based on a changed locality thereof.

In an embodiment, the cache memory 240 may be configured of a static random access memory (SRAM).

In an embodiment, the cache memory 240 may actively allocate cache lines for storing the received map data or command data. At this time, the cache memory 240 may allocate the cache lines according to a component that outputs the map data or the command data, e.g., the central processor 210 or the DMA controller. That is, the cache lines to store the map data or the command data may be allocated without additional information from the outside, e.g., the host 300.

In an embodiment, the memory controller 200 may include the memory buffer 250. The memory buffer 250 may be configured of a dynamic random access memory (DRAM).

The memory buffer 250 may store the map data or the command data received through the cache memory 240. In addition, the map data or the command data stored in the memory buffer 250 may be output through the cache memory 240 by a request of the central processor 210 or the DMA controller 220. In another embodiment, the memory buffer 250 may output all map data stored therein according to a flush request from the host 300 to the memory device 100 through the cache memory 240.

Furthermore, the map data stored in the memory buffer 250 may be updated as the flash translation layer 230 forms a new mapping relationship.

In an embodiment, the storage device 50 may further include a buffer memory (not shown). The memory controller 200 may control data exchange between the host 300 and the buffer memory (not shown). Alternatively, the memory controller 200 may temporarily store system data for controlling the memory device 100 in the buffer memory. For example, the memory controller 200 may temporarily store data input from the host 300 in the buffer memory, and then transmit data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM), such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR) SDRAM, or Rambus dynamic random access memory (DRAM), or a static random access memory (SRAM).

In various embodiments, the buffer memory may be connected from an outside of the storage device 50. In this case, volatile memory devices connected to the outside of the storage device 50 may serve as the buffer memory.

In an embodiment, the memory controller 200 may control at least two or more memory devices. In this case, the memory controller 200 may control the memory devices according to an interleaving method in order to improve operation performance.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
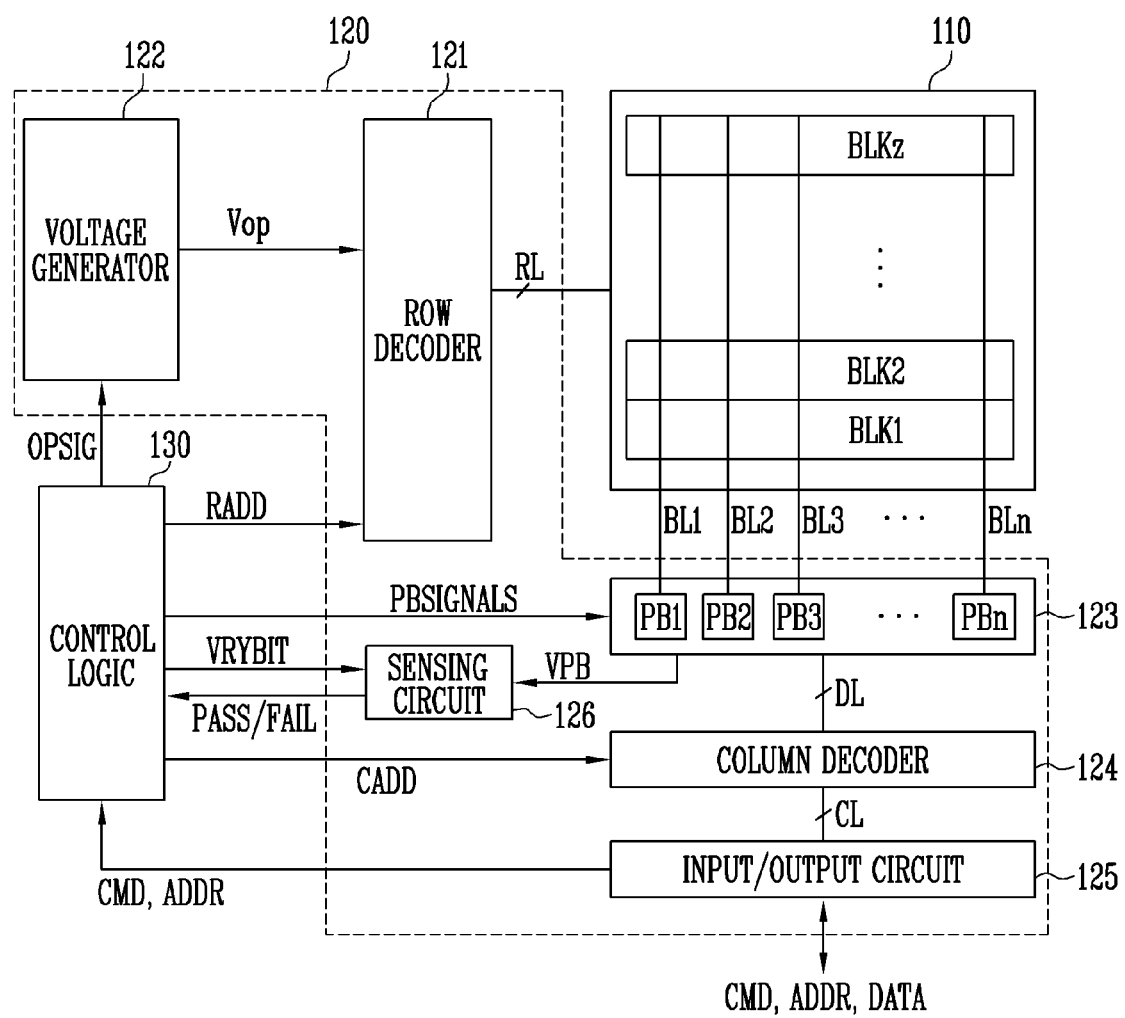
FIG. 2 is a diagram illustrating a structure of a memory device of FIG. 1.

FIG. 2 is a diagram illustrating a structure of the memory device 100 of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The plurality of memory blocks BLK1 to BLKz may be connected to a page buffer group 123 through bit lines BL1 to BLn. Each of the plurality of memory blocks BLK1 to BLKz includes a plurality of memory cells. In an embodiment, the plurality of memory cells are non-volatile memory cells. Memory cells connected to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as a single level cell (SLC) that stores one bit of data, a multi-level cell (MLC) that stores two bits of data, a triple level cell (TLC) that stores three bits of data, or a quadruple level cell (QLC) that stores four bits of data.

The peripheral circuit 120 may be configured to perform a program operation, a read operation, or an erase operation on a selected region of the memory cell array 110 under the control of the control logic 130. The peripheral circuit 120 may drive the memory cell array 110. For example, the peripheral circuit 120 may apply various operation voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 is configured to decode a row address RADD received from the control logic 130. The row decoder 121 selects at least one memory block among the memory blocks BLK1 to BLKz according to a decoded address. In addition, the row decoder 121 may select at least one word line WL of the selected memory block according to the decoded address to apply voltages generated by the voltage generator 122 to the at least one word line WL.

For example, during the program operation, the row decoder 121 may apply a program voltage to a selected word line and apply a program pass voltage to an unselected word line, the program pass voltage having a lower level than the program voltage. During a program verify operation, the row decoder 121 may apply a verify voltage to the selected word line and a verify pass voltage to the unselected word line, the verify pass voltage having a higher level than the verify voltage. During the read operation, the row decoder 121 may apply a read voltage to the selected word line and apply a read pass voltage to the unselected word line, the read pass voltage having a higher level than the read voltage.

In an embodiment, the erase operation of the memory device 100 is performed in a memory block unit. During the erase operation, the row decoder 121 may select one memory block according to the decoded address. During the erase operation, the row decoder 121 may apply a ground voltage to word lines connected to the selected memory block.

The voltage generator 122 operates in response to the control of the control logic 130. The voltage generator 122 is configured to generate a plurality of voltages using an external power voltage supplied to the memory device 100. Specifically, the voltage generator 122 may generate various operation voltages Vop used for the program, read, and erase operations, in response to an operation signal OPSIG. For example, the voltage generator 122 may generate the program voltage, the verify voltage, the pass voltage, the read voltage, an erase voltage, and the like in response to the control of the control logic 130.

In an embodiment, the voltage generator 122 may generate an internal power voltage by regulating the external power voltage. The internal power voltage generated by the voltage generator 122 is used to generate the various operation voltages of the memory device 100.

That is, the voltage generator 122 may generate a plurality of voltages using the external power voltage or the internal power voltage.

For example, the voltage generator 122 may include a plurality of pumping capacitors that receive the internal power voltage, and may selectively activate the plurality of pumping capacitors to generate the plurality of voltages, in response to the control of the control logic 130.

The generated plurality of voltages may be supplied to the memory cell array 110 by the row decoder 121.

The page buffer group 123 includes first to n-th page buffers PB1 to PBn. The first to n-th page buffers PB1 to PBn are connected to the memory cell array 110 through the first to n-th bit lines BL1 to BLn, respectively. The first to n-th page buffers PB1 to PBn operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read operation or the program verify operation.

Specifically, during the program operation, when the program voltage is applied to the selected word line, the first to n-th page buffers PB1 to PBn may transfer data DATA received through the input/output circuit 125 to memory cells of a selected page coupled to the selected word line through the first to n-th bit lines BL1 to BLn. The memory cells of the selected page are programmed according to the transferred data DATA. During the program verify operation, the first to n-th page buffers PB1 to PBn may read page data by sensing the voltage or the current received from the selected memory cells through the first to n-th bit lines BL1 to BLn.

During the read operation, the first to n-th page buffers PB1 to PBn read data from the memory cells of the selected page through the first to n-th bit lines BL1 to BLn, and outputs the read data to the input/output circuit 125 under the control of the column decoder 124.

During the erase operation, the first to n-th page buffers PB1 to PBn may float the first to n-th bit lines BL1 to BLn or apply the erase voltage.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer a command CMD and an address ADDR received from the memory controller 200 of FIG. 1 to the control logic 130, or may exchange data DATA with the column decoder 124.

The sensing circuit 126 may generate a reference current in response to a permission bit signal VRYBIT during the read operation or the program verify operation, and compare a sensing voltage VPB received from the page buffer group 123 with a reference voltage generated by the reference current to output a pass signal PASS or a fail signal FAIL to the control logic 130.

The control logic 130 may output the operation signal OPSIG, the row address RADD, the page buffer control signals PBSIGNALS, and the permission bit signal VRYBIT based on the command CMD and the address ADDR to thereby control the peripheral circuit 120. For example, the control logic 130 may control the read operation for the selected memory block in response to a sub block read command and the address ADDR. In addition, the control logic 130 may control the erase operation for a selected sub block included in the selected memory block in response to a sub block erase command and the address ADDR. In addition, the control logic 130 may determine whether the program verity operation is passed or failed in response to the pass signal PASS or the fail signal FAIL.

Figure 3:
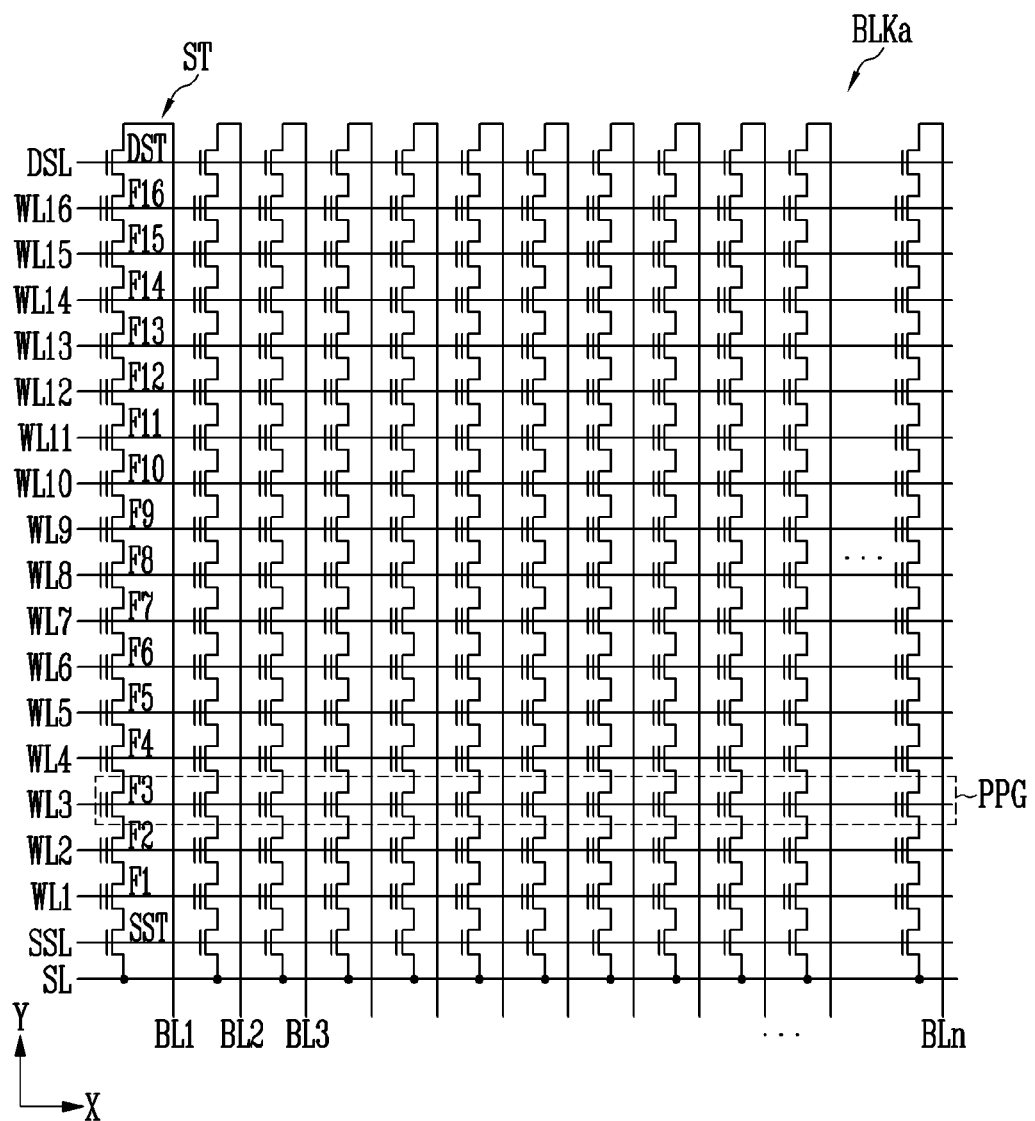
FIG. 3 is a diagram illustrating a memory cell array of FIG. 2.

FIG. 3 is a diagram illustrating the memory cell array 110 of FIG. 2.

FIG. 3 illustrates any one memory block BLKa among the plurality of memory blocks BLK1 to BLKz included in the memory cell array 110 of FIG. 2.

A first select line, word lines, and a second select line arranged in parallel with each other may be connected to the memory block BLKa. For example, the word lines may be arranged in parallel with each other between the first and second select lines. Here, the first select line may be a source select line SSL, and the second select line may be a drain select line DSL.

More specifically, the memory block BLKa may include a plurality of strings connected between bit lines BL1 to BLn and a source line SL. The bit lines BL1 to BLn may be connected to the strings, respectively, and the source line SL may be commonly connected to the strings. Since the strings may be configured to be identical to each other, a string ST connected to the first bit line BL1 will be specifically described, as an example.

The string ST may include a source select transistor SST, a plurality of memory cells F1 to F16, and a drain select transistor DST connected in series between the source line SL and the first bit line BL1. In other embodiments, one string ST may include at least one source select transistor SST and at least one drain select transistor DST, and may include a plurality of memory cells whose number is greater than that of the memory cells F1 to F16.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of source select transistors SST included in different strings may be commonly connected to the source select line SSL, gates of drain select transistors DST included in the different strings may be commonly connected to the drain select line DSL, and gates of the memory cells F1 to F16 may be connected to a plurality of word lines WL1 to WL16. A group of memory cells connected to the same word line among memory cells included in the different strings may be referred to as a physical page PPG. Therefore, the memory block BLKa may include at least a plurality of physical pages PPG corresponding to the number of the word lines WL1 to WL16.

One memory cell may store one bit of data. This is commonly referred to as a single level cell (SLC). In this case, one physical page PPG may store data of one logical page LPG. The data of one logical page LPG may include data corresponding to the number of memory cells included in one physical page PPG. In addition, one memory cell may store two or more bits of data. In this case, one physical page PPG may store data of two or more logical pages LPGs. That is, the physical page PPG corresponds to the two or more logical pages LPGs.

A memory cell in which two or more bits of data are stored is referred to as a multi-level cell (MLC), but recently, as the number of bits of data stored in one memory cell increases, the multi-level cell (MLC) refers to a memory cell in which two bits of data is stored, a memory cell in which three bits of data are stored is referred to as a triple level cell (TLC), and a memory cell in which four bits of data are stored is referred to as a quadruple level cell (QLC). In addition, a memory cell in which a plurality of bits of data are stored has been developed, and the present embodiment may be applied to the memory device 100 in which two or more bits of data are stored in each memory cell.

In another embodiment, a memory block may have a three-dimensional structure. In the three-dimensional structure, each memory block includes a plurality of memory cells stacked on a substrate. Such plurality of memory cells are arranged along a +X direction, a +Y direction, and a +Z direction.

Figure 4:
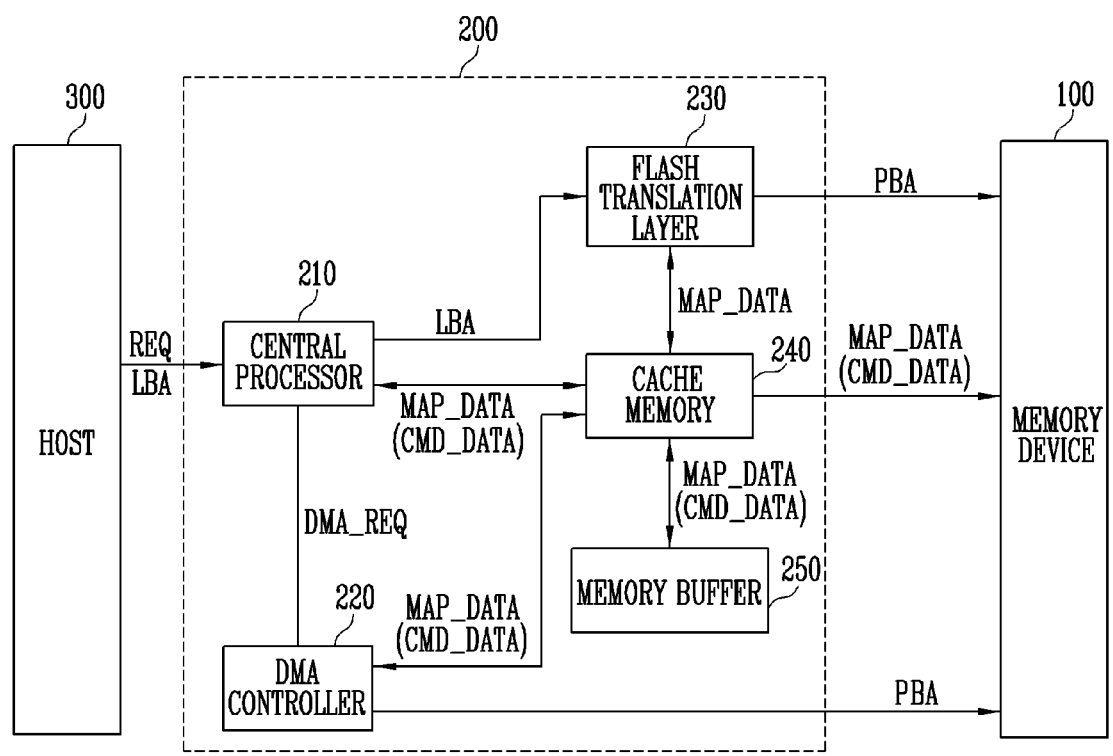
FIG. 4 is a diagram illustrating a memory controller of FIG. 1.

FIG. 4 is a diagram illustrating a configuration of the memory controller 200 of FIG. 1.

Referring to FIG. 4, the memory controller 200 may include the central processor 210, the DMA controller 220, the flash translation layer 230, the cache memory 240, and the memory buffer 250. FIG. 4 shows an operation of the memory controller 200 for performing an operation corresponding to a request REQ of the host 300.

In an embodiment, the central processor 210 may receive the request REQ and a logical block address LBA corresponding to the request REQ from the host 300. The request REQ received from the host 300 may be any one of a program request, a read request, and an erase request.

In an embodiment, the central processor 210 may output the logical block address LBA received from the host 300 together with the request REQ to the flash translation layer 230, in order to output a physical block address PBA corresponding to the logical block address LBA to the memory device 100. That is, the central processor 210 may output the logical block address LBA corresponding to the request REQ received from the host 300 to the flash translation layer 230 in order to output, to the memory device 100, a physical block address PBA indicating a page on which a program operation is to be performed, a physical block address PBA indicating a page on which a read operation is to be performed, or a physical block address PBA indicating a memory block on which an erase operation is to be performed.

In addition, the central processor 210 may generate a command corresponding to the request REQ received from the host 300 and output the generated command as command data CMD_DATA. The command data CMD_DATA may be output to the memory device 100, and an operation corresponding to the command data CMD_DATA may be performed on the memory device 100. In an embodiment, the command data CMD_DATA may include a flag indicating an address of the memory buffer 250 in which the command data CMD_DATA is stored.

The flash translation layer 230 may form a mapping relationship between the logical block address LBA received from the central processor 210 and the physical block address PBA. That is, the flash translation layer 230 may generate map data MAP_DATA representing the mapping relationship between the logical block address LBA and the physical block address PBA, which corresponds to the request REQ. The generated map data MAP_DATA may be configured as a logical-physical address mapping table configuring the mapping relationship between the logical block address LBA and the physical block address PBA.

When the mapping table is configured, the flash translation layer 230 may output the physical block address PBA to the memory device 100.

In an embodiment, the flash translation layer 230 may output the generated map data MAP_DATA to the cache memory 240. The cache memory 240 may store the map data MAP_DATA received from the flash translation layer 230 and output the stored map data MAP_DATA to the memory buffer 250. The memory buffer 250 may store the map data MAP_DATA output from the cache memory 240.

The cache memory 240 may cache the map data MAP_DATA or the command data CMD_DATA based on a locality of the map data MAP_DATA or the command data CMD_DATA.

The locality of the map data MAP_DATA may mean that data corresponding to the map data MAP_DATA has a high possibility to be referred again, and may be any one of a temporal locality and a spatial locality. The temporal locality indicates frequent access to the map data MAP_DATA corresponding to previously referred data, and the spatial locality is spatial proximity to an address of a memory region where the previously referred data is stored. In addition, the map data MAP_DATA cached in the cache memory 240 may be updated based on a changed locality thereof.

The locality of the command data CMD_DATA may mean that the command data CMD_DATA corresponding to the data has high possibility to be referred again, and the command data CMD_DATA may include information on the physical block address PBA for the corresponding data. That is, in case of the command data CMD_DATA, the locality may be any one of the temporal locality and the spatial locality. The temporal locality indicates frequent access to the data corresponding to previously referred command data CMD_DATA, and the spatial locality is spatial proximity to an address of a memory region where the data corresponding to the previously referred command data CMD_DATA is stored. In addition, the command data CMD_DATA cached in the cache memory 240 may be updated based on a changed locality thereof.

Thereafter, the map data MAP_DATA or the command data CMD_DATA cached in the cache memory 240 may be output to the central processor 210 or the DMA controller 220 in response to the request REQ from the central processor 210 or the DMA controller 220. The central processor 210 or the DMA controller 220 may output the physical block address PBA to the memory device 100 based on the map data MAP_DATA or the command data CMD_DATA received from the cache memory 240.

In an embodiment, the request REQ received from the host 300 may be a request for receiving data from the memory device 100 without control of the central processor 210. In this case, the central processor 210 may output a DMA request DMA_REQ to the DMA controller 220 in response to the request REQ of the host 300. The DMA controller 220 may communicate with the memory device 100 without the control of the central processor 210 based on the DMA request DMA_REQ received from the central processor 210.

For example, when transmitting or receiving data, the DMA controller 220 may initially receive the DMA request DMA_REQ from the central processor 210 to instruct the transmitting or receiving of the data, and then may exchange the data with the memory device 100 without an instruction of the central processor 210.

Therefore, the DMA controller 220 may read the map data MAP DATA or the command data CMD_DATA stored in the cache memory 240 or the memory buffer 250, and may control the memory device 100 to perform an operation based on the map data MAP_DATA or command data CMD_DATA. For example, the DMA controller 220 may read the map data MAP_DATA or the command data CMD_DATA stored in the cache memory 240 or the memory buffer 250 to output the physical block address PBA corresponding to an operation for transmitting (or receiving) the data to the memory device 100.

In an embodiment, the flash translation layer 230 may store the map data MAP_DATA in the memory device 100 every predetermined period to prepare for a sudden power off (SPO) and the like. At this time, since the flash translation layer 230 reads all map data MAP_DATA stored in the memory buffer 250 and stores the all map data MAP_DATA in the memory device 100, the map data MAP_DATA stored in the cache memory 240 may be flushed to the memory device 100.

Alternatively, the cache memory 240 may read all command data CMD_DATA stored in the memory buffer 250 and flush the all command data CMD_DATA to the memory device 100 every predetermined period or in order to prevent a cache-hit rate from being decreased.

At this time, since all map data MAP_DATA or command data CMD_DATA stored in the cache memory 240 are flushed to the memory device 100, a cache-hit rate for the map data MAP_DATA or the command data CMD_DATA stored in the cache memory 240 may be decreased. That is, since all map data MAP_DATA or command data CMD_DATA are flushed to the memory device 100, the cache-hit rate for the cached map data MAP_DATA or command data CMD_DATA may be decreased.

At this time, when the map data MAP_DATA or the command data CMD_DATA corresponding to the request REQ is present in the cache memory 240, a cache-hit may occur. When the map data MAP_DATA or the command data CMD_DATA corresponding to the request REQ is not present in the cache memory 240, a cache-miss may occur. When the cache-miss occurs, the map data MAP_DATA or the command data CMD_DATA stored in the memory buffer 250 of FIG. 4 may be provided to the central processor 210 or the DMA controller 220 through the cache memory 240.

In order to increase the cache-hit rate, the memory controller 200 may allocate cache lines to the cache memory 240. The cache memory 240 may receive the map data MAP_DATA or the command data CMD_DATA from the central processor 210 or the DMA controller 220 and actively allocate the cache lines to cache the map data MAP_DATA or the command data CMD_DATA.

Specifically, cache-missed map data MAP_DATA or cache-missed command data CMD_DATA except for cache-hit map data MAP_DATA or cache-hit command data CMD_ DATA may be transmitted from the memory buffer 250 to the cache memory 240. The cache-missed data is not present in the cache memory 240, whereas the cache-hit data is already stored in the cache memory 240. When the cache miss occurs, the cache-missed map data MAP_DATA or the cache-missed command data CMD_DATA may be transmitted to the cache memory 240 with reference to the locality thereof.

In the present disclosure, in order to increase the cache-hit rate for the map data MAP_DATA or the command data CMD_DATA stored in the cache memory 240, a method of allocating cache lines for transmitting the map data MAP_DATA to the cache memory 240 is presented.

FIGS. 5 to 8 are diagrams illustrating transmission of the map data MAP_DATA or the command data CMD_DATA between the memory controller 200 and the memory device 100.

Referring to FIGS. 5 to 8, the memory controller 200 may include the central processor 210, the cache memory 240, and the memory buffer 250. In FIGS. 5 to 8, the DMA controller 220 of FIG. 4 and the flash translation layer 230 of FIG. 4 are not shown.

In an embodiment, the memory buffer 250 may store the map data MAP_DATA or the command data CMD_DATA received from the memory device 100, and the cache memory 240 may cache the map data MAP_DATA or the command data CMD_DATA stored in the memory buffer 250.

Figure 5:
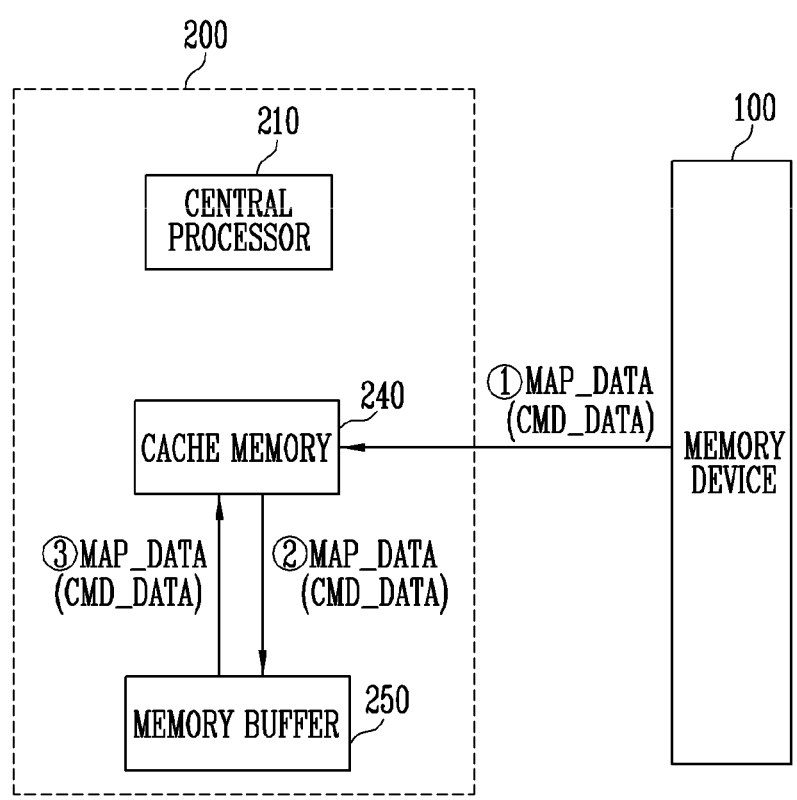
FIGS. 5 to 8 are diagrams illustrating transmission of map data or command data between the memory controller and the memory device.

Specifically, referring to FIG. 5, when a memory system including the memory controller 200 and the memory device 100 is booted, the memory device 100 may read the map data MAP_DATA or the command data CMD_DATA stored in a system area of the memory device 100, and transmit the read map data MAP_DATA or command data CMD_DATA to the memory controller 200. The memory controller 200 may receive the map data MAP_DATA or the command data CMD_DATA from the memory device 100 and store the received map data MAP_DATA or command data CMD_ DATA in the cache memory 240 (①).

In an embodiment, the cache memory 240 may include a memory ECC engine (not shown). Specifically, a parity may be added to the map data MAP_DATA or the command data CMD_DATA by performing ECC encoding through the memory ECC engine of the cache memory 240, and the map data MAP_DATA or the command data CMD_DATA to which the parity is added may be transmitted from the cache memory 240 to the memory buffer 250 (②).

In an embodiment, the cache memory 240 may be a static random access memory (SRAM) module.

In an embodiment, the memory buffer 250 may store the map data MAP_DATA or the command data CMD_DATA received from the cache memory 240. Here, the memory buffer 250 may be a dynamic random access memory (DRAM) module.

In an embodiment, the map data MAP_DATA or the command data CMD_DATA stored in the memory buffer 250 may be transmitted to the cache memory 240. At this time, the cache memory 240 may cache the map data MAP_DATA or the command data CMD_DATA received from the memory buffer 250. The cache memory 240 may decode the map data MAP_DATA or the command data CMD_DATA received from the memory buffer 250 using the memory ECC engine, and cache the decoded map data MAP_DATA or the decoded command data CMD_DATA therein (③).

Figure 6:
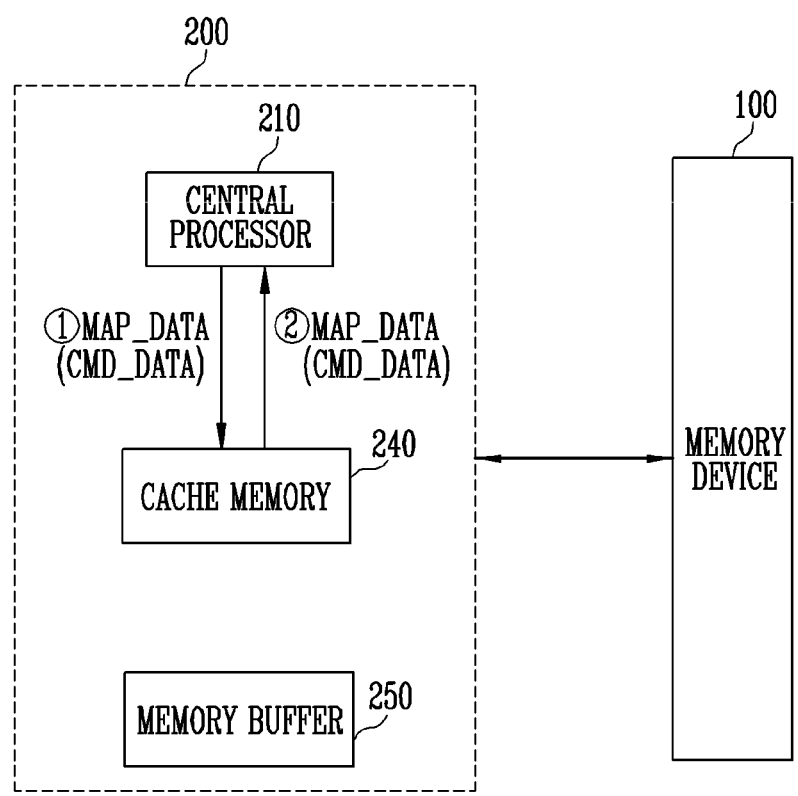

Referring to FIG. 6, when the memory system receives a read request from the host 300 of FIG. 4, the memory controller 200 may inquire whether or not target data that is the map data MAP_DATA or the command data CMD_ DATA for performing the read request is cached in the cache memory 240 (①).

Specifically, when the target data is cached in the cache memory 240, the central processor 210 may receive the target data cached in the cache memory 240 and refer to the received target data to perform the requested read operation (②). For example, data stored in a memory region indicated by a physical block address PBA corresponding to the cached map data MAP_DATA may be read, or a read command corresponding to the cached command data CMD_DATA may be output to the memory device 100 and the read operation responding to the read command may be performed.

Here, as the target data cached in the cache memory 240 is output, the map data MAP_DATA or the command data CMD_DATA cached in the cache memory 240 may be hit (cache-hit). However, when the target data is not cached in the cache memory 240, the map data MAP_DATA or the command data CMD_DATA may not be hit (cache-miss).

Figure 7:
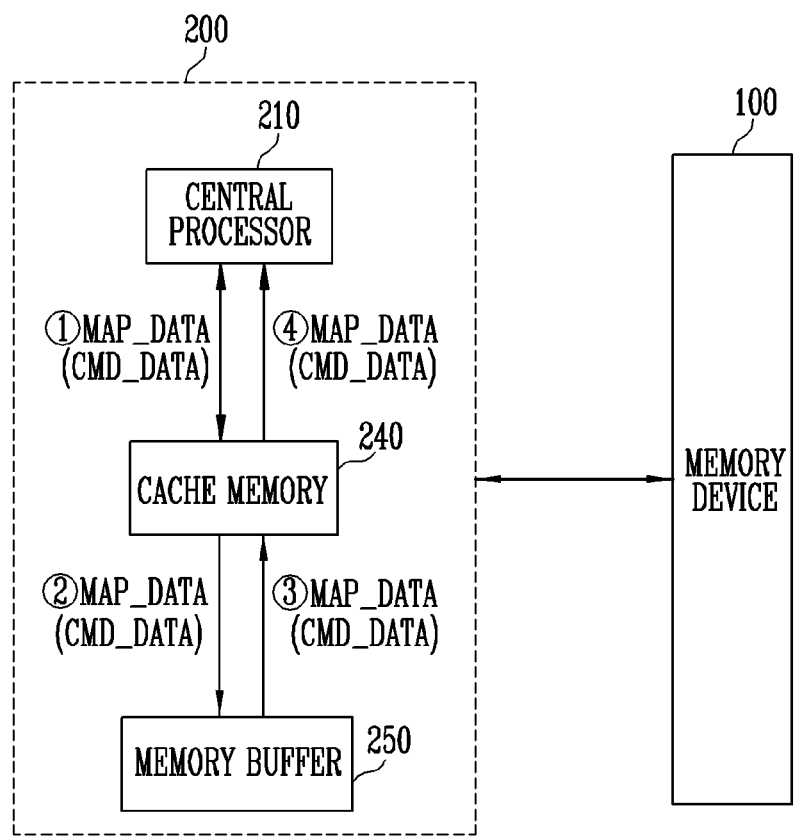

Referring to FIG. 7, when the memory system receives the read request from the host 300 of FIG. 4, the memory controller 200 may inquire whether or not the target data that is the map data MAP_DATA or the command data CMD_ DATA for performing the read request is cached in the cache memory 240 (①).

In an embodiment, when the target data is cached in the cache memory 240, the central processor 210 may receive the target data from the cache memory 240 (①). On the other hand, when the target data is not cached in the cache memory 240, the central processor 210 may inquire the memory buffer 250 (②), and the target data stored in the memory buffer 250 may be transmitted to the cache memory 240 (③). The central processor 210 may perform the requested read operation based on the target data received from the cache memory 240 or the memory buffer 250 (④).

In an embodiment, when the target data received from the memory buffer 250 has a locality, the cache memory 240 may cache the target data therein. At this time, the cache memory 240 may transmit the target data cached therein to the central processor 210.

Here, the locality of the map data MAP_DATA may mean that data corresponding to the map data MAP_DATA has a high possibility to be referred again, and may be any one of a temporal locality and a spatial locality. The temporal locality indicates frequent access to the map data MAP_ DATA corresponding to previously referred data, and the spatial locality is spatial proximity to an address of a memory region where the previously referred data is stored.

In an embodiment, when the target data received from the memory buffer 250 does not have the locality, the cache memory 240 may not cache the target data therein. At this time, the cache memory 240 or the memory buffer 250 may transmit the target data to the central processor 210.

In an embodiment, when the command data CMD_DATA received from the memory buffer 250 has a locality, the cache memory 240 may cache the command data CMD_ DATA therein. At this time, the cache memory 240 may transmit the command data CMD_DATA cached therein to the central processor 210. Here, the locality of the command data CMD_DATA may mean that the command data CMD_ DATA corresponding to the data has a high possibility to be referred again, and the command data CMD_DATA corresponding to the data may include information on a physical block address PBA for the data.

That is, in the case of the command data CMD_DATA, the locality may be any one of a temporal locality and a spatial locality. The temporal locality indicates frequent access to the data corresponding to previously referred command data CMD_DATA, and the spatial locality is spatial proximity to an address of a memory region where the data corresponding to the previously referred command data CMD_DATA is stored.

In an embodiment, when the command data CMD_DATA received from the memory buffer 250 does not have the locality, the cache memory 240 may not cache the command data CMD_DATA therein. At this time, the cache memory 240 or the memory buffer 250 may transmit the command data CMD_DATA to the central processor 210.

In an embodiment, the cache memory 240 may decode the target data received from the memory buffer 250 and transmit the decoded target data to the central processor 210.

When an operation is performed using a DMA method, the cache memory 240 may transmit the decoded target data to the DMA controller 220.

Figure 8:
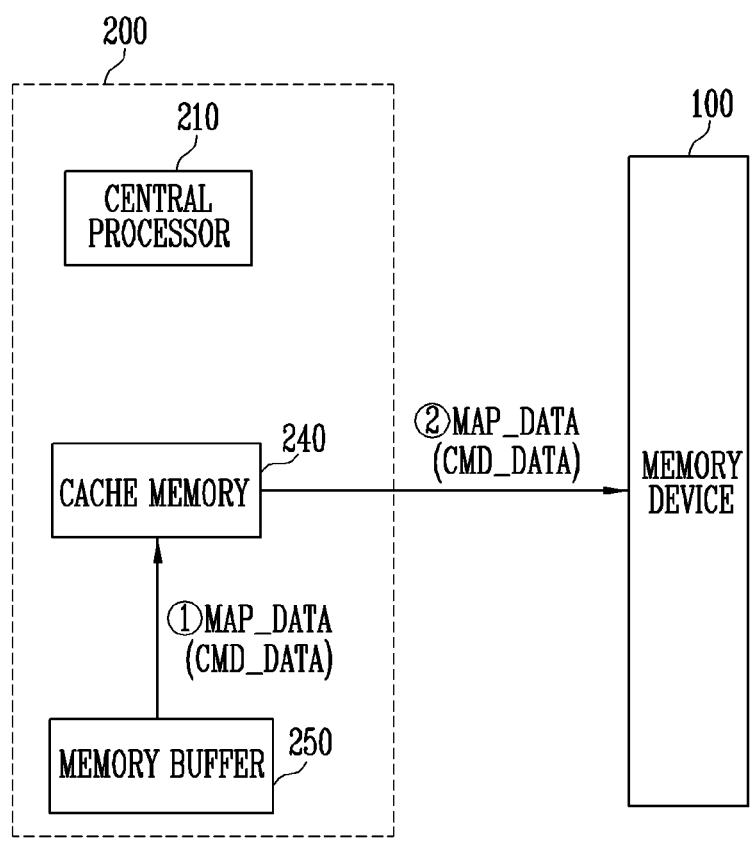

Referring to FIG. 8, when the number of times a program operation requested by the host 300 of FIG. 4 is performed is equal to or greater than a preset number of times, or when the number of times a read operation requested by the host 300 of FIG. 4 is performed is equal to or greater than a preset number of times, the map data MAP_DATA or the command data CMD_DATA stored in the memory buffer 250 may be transmitted to the memory device 100. The memory device 100 may store the map data MAP_DATA or the command data CMD_DATA received from the memory controller 200 in the system area thereof.

In an embodiment, the map data MAP_DATA or the command data CMD_DATA stored in the memory buffer 250 may be transmitted to the cache memory 240 (①), and the cache memory 240 may transmit the map data MAP_DATA or the command data CMD_DATA received from the memory buffer 250 to the memory device 100 (②). At this time, the cache memory 240 may decode the map data MAP_DATA or the command data CMD_DATA received from the memory buffer 250, and transmit the decoded map data MAP_DATA or the decoded command data CMD_DATA to the memory device 100.

Referring to FIGS. 5 to 8, the map data MAP_DATA or the command data CMD_DATA may be cached in the cache memory 240 according to the locality of the map data MAP_DATA or the command data CMD_DATA. Furthermore, the map data MAP_DATA or the command data CMD_DATA cached in the cache memory 240 may be cache-hit or cache-missed according to an operation performed on the memory device 100. That is, the map data MAP_DATA or the command data CMD_DATA cached in the cache memory 240 may be or may not be output according to the operation performed on the memory device 100. As a result, the map data MAP_DATA or the command data CMD_DATA cached in the cache memory 240 may not be evenly referred.

Therefore, the present disclosure presents a method of actively allocating cache lines of the cache memory 240 based on access information related to a subject accessing map data MAP_DATA or command data CMD_DATA corresponding to a request REQ and a size of the map data MAP_DATA or the command data CMD_DATA. That is, the present disclosure presents a method of caching the map data MAP_DATA or the command data CMD_DATA in the cache memory 240.

FIG. 9 is a diagram illustrating transmission of command data between components included in the memory controller 200 of FIG. 1 according to an embodiment.

Referring to FIG. 9, the memory controller 200 may include the central processor 210, the DMA controller 220, the cache memory 240, and the memory buffer 250. FIG. 9 shows an operation of the memory controller 200 that transmits and receives command data CMD_DATA to perform an operation corresponding to a request REQ of the host 300.

In FIG. 9, the flash translation layer 230 of FIG. 4 is not shown.

In an embodiment, the central processor 210 may receive the request REQ from the host 300. The request REQ received from the host 300 may be any one of a program request, a read request, and an erase request.

The central processor 210 may generate a command corresponding to the request REQ received from the host 300 and output the generated command as the command data CMD_DATA. The command data CMD_DATA may be output to the memory device 100 of FIG. 1, and an operation corresponding to the command may be performed on the memory device 100 of FIG. 1. At this time, the central processor 210 may output the command data CMD_DATA in a 4BYTE unit.

In an embodiment, the central processor 210 may output the command data CMD_DATA to the cache memory 240. The command data CMD_DATA may be output to the memory device 100, and the operation corresponding to the command data CMD_DATA may be performed on the memory device 100.

In an embodiment, the request REQ received from the host 300 may be a request for receiving data from the memory device 100 of FIG. 1 without the control of the central processor 210. In this case, the central processor 210 may output the command data CMD_DATA to the DMA controller 220 in response to the request REQ of the host 300.

The DMA controller 220 may communicate with the memory device 100 of FIG. 1 without the control of the central processor 210 based on the command data CMD_DATA received from the central processor 210. At this time, since the DMA controller 220 outputs the command data CMD_DATA without the control of the central processor 210, the DMA controller 220 may output the command data CMD_DATA corresponding to various sizes to the cache memory 240. Therefore, the command data CMD_DATA output from the DMA controller 220 to the cache memory 240 is required to be allocated according to cache lines.

In an embodiment, the DMA controller 220 may read the command data CMD_DATA stored in the cache memory 240 or the memory buffer 250 and control the memory device 100 of FIG. 1 to perform an operation corresponding to the command data CMD_DATA. For example, the DMA controller 220 may read the command data CMD_DATA stored in the cache memory 240 or the memory buffer 250 and output the command data CMD_DATA to the memory device 100 of FIG. 1, and the operation corresponding to the command data CMD_DATA may be performed on the memory device 100 of FIG. 1.

In an embodiment, the cache memory 240 may perform an operation of actively allocating the cache lines to allocate the command data CMD_DATA according to the subject that outputs the command data CMD_DATA. At this time, a size of a reference cache line may be allocated in a 8BYTE unit.

For example, since the command data CMD_DATA is output in a 4BYTE unit when the command data CMD_DATA is output from the central processor 210, the cache memory 240 may not separately allocate cache lines to store the command data CMD_DATA from the central processor 210. That is, since the command data CMD_DATA output from the central processor 210 does not exceed 8BYTES, which is the size of the reference cache line, the cache memory 240 may not separately allocate the cache lines for the command data CMD_DATA.

However, since the command data CMD_DATA is output in various sizes when the command data CMD_DATA is output from the DMA controller 220, the cache memory 240 may actively allocate the cache lines to store the command data CMD_DATA output in the various sizes. That is, since the command data CMD_DATA output from the DMA controller 220 may exceed 8BYTES or be less than 8BYTES, the cache memory 240 may actively allocate the cache lines to store the command data CMD_DATA.

FIG. 10 is a diagram illustrating a unit in which command data is flushed to the memory device 100 of FIG. 1.

Referring to FIG. 10, the command data CMD_DATA stored in the cache memory 240 of FIG. 9 is flushed in a unit.

In an embodiment, first to fourth command data CMD_DATA1 to CMD_DATA4 may be stored in the cache memory 240 of FIG. 9. Each of the first to fourth command data CMD_DATA1 to CMD_DATA4 may be command data corresponding to the request REQ of the host 300 of FIG. 9.

The cache memory 240 may flush the stored command data CMD_DATA1 to CMD_DATA4 to the memory device 100 every predetermined period to prepare for sudden power off (SPO) or the like or to prevent a cache-hit rate from being decreased. At this time, the command data CMD_DATA1 to CMD_DATA4 may be flushed in a 128 BYTE unit. For example, since each of the first to fourth command data CMD_DATA1 to CMD_DATA4 has a size of 32BYTES, the first to fourth command data CMD_DATA1 to CMD_DATA4 may be flushed at a time.

However, when the first to fourth command data CMD_DATA1 to CMD_DATA4 stored in the cache memory 240 are flushed to the memory device 100, the cache-hit rate may be decreased. Therefore, command data stored in the cache memory 240 may be prevented from being frequently flushed.

Hereinafter, a cache line allocating method for preventing the command data stored in the cache memory 240 from being frequently flushed is presented.

Figure 11:
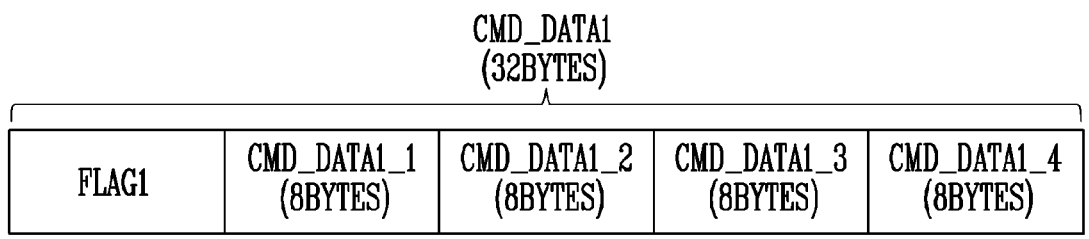
FIG. 11 is a diagram illustrating command data allocated to one cache line.

FIG. 11 is a diagram illustrating command data allocated to one cache line.

FIG. 11 shows the first command data CMD_DATA1 of FIG. 10 and a method of allocating cache lines to store the first command data CMD_DATA1. At this time, it is assumed that the first command data CMD_DATA1 is received from the DMA controller 220 of FIG. 9. That is, since command data is received from the central processor 210 of FIG. 9 in a 4BYTE unit, the command data received from the central processor 210 does not exceed 8BYTES which is a size of one cache line that is a reference cache line, and thus it is not necessary to allocate cache lines having different sizes. Therefore, in FIG. 11, it is assumed that the command data CMD_DATA1 is received from the DMA controller 220 of FIG. 9.

In an embodiment, the first command data CMD_DATA1 may be configured of a flag and divided command data. At this time, the flag may include an address bit indicating an address of the memory buffer 250 of FIG. 9 in which the first command data CMD_DATA1 is stored, and may include information on a start address and an end address designating a storage region of the memory buffer 250 in which the first command data CMD_DATA1 is stored. In addition, the cache memory 240 of FIG. 9 may determine a size of the first command data CMD_DATA1 stored in the memory buffer 250 based on the start address and the end address included in the flag.

For example, the first command data CMD_DATA1 may include first flag FLAG1 and (1_1)-th to (1_4)-th divided command data CMD_DATA1_1 to CMD_DATA1_4. The first flag FLAG1 may include information on the start address and the end address designating the storage region of the memory buffer 250 in which the first command data CMD_DATA1 is stored. In addition, the (1_1)-th to (1_4)-th divided command data CMD_DATA1_1 to CMD_DATA1_4 may be obtained by dividing the first command data CMD_DATA1, and each of the (1_1)-th to (1_4)-th divided command data CMD_DATA1_1 to CMD_DATA1_4 may have a size of 8BYTES.

Therefore, in FIG. 11, since the first command data CMD_DATA1 has the size of 32BYTES, and each of the (1_1)-th to (1_4)-th divided command data CMD_DATA1_1 to CMD_DATA1_4 has the size of 8BYTES, an operation of allocating separate cache lines to store the first command data CMD_DATA1 in the cache memory 240 is not required. That is, the (1_1)-th to (1_4)-th divided command data CMD_DATA1_1 to CMD_DATA1_4 of the first command data CMD_DATA1 may be directly stored in the cache memory 240 based on the cache lines having the size of 8BYTES.

In an embodiment, command data may be accessed by the central processor 210 of FIG. 9 in a 4BYTE unit or a 8BYTE unit. Therefore, in FIG. 11, when the first command data CMD_DATA1 is accessed by the central processor 210 of FIG. 9 in the 4BYTE unit, command data obtained by sub-dividing the (1_1)-th to (1_4)-th divided command data CMD_DATA1_1 to CMD_DATA1_4 may be accessed by the central processor 210 of FIG. 9.

Figure 12:
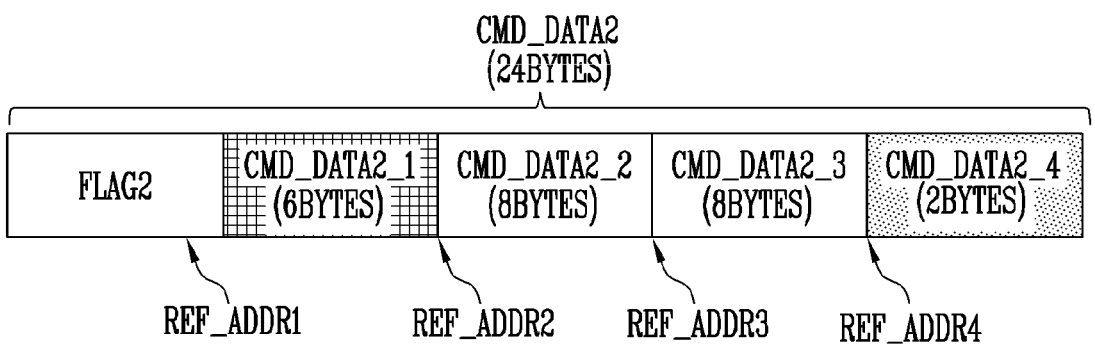
FIG. 12 is a diagram illustrating a method of allocating cache lines when the cache lines are not evenly allocated.

FIG. 12 is a diagram illustrating a method of allocating cache lines when the cache lines are not evenly allocated.

In particular, FIG. 12 shows a method of allocating cache lines to store the second command data CMD_DATA2 of FIG. 10. At this time, it is assumed that the second command data CMD_DATA2 is received from the DMA controller 220 of FIG. 9. That is, since command data is received from the central processor 210 of FIG. 9 in a 4BYTE unit, the command data does not exceed 8BYTES which is the size of the reference cache line, and thus it is not necessary to allocate cache lines. Therefore, in FIG. 12, it is assumed that the second command data CMD_DATA2 is received from the DMA controller 220 of FIG. 9.

In an embodiment, the second command data CMD_DATA2 may include a second flag FLAG2 and (2_1)-th to (2_4)-th divided command data CMD_DATA2_1 to CMD_DATA2_4. The second flag FLAG2 may include information on a start address and an end address designating a storage region of the memory buffer 250 of FIG. 9 in which the second command data CMD_DATA2 is stored. In addition, the (2_1)-th to (2_4)-th divided command data CMD_DATA2_1 to CMD_DATA2_4 may be obtained by dividing the second command data CMD_DATA2.

However, as a result of determining a size of the second command data CMD_DATA2 based on the information on the start address and the end address included in the second flag FLAG2, the size of the second command data CMD_DATA2 may not be 32BYTES. That is, the size of the second command data CMD_DATA2 may be determined based on the start address and the end address included in the second flag FLAG2, and as a result, the size of the second command data CMD_DATA2 may be 24BYTES rather than 32BYTES.

In this case, the cache memory 240 of FIG. 9 may determine whether the start address included in the second flag FLAG2 is any one of a plurality of reference addresses. At this time, divided command data corresponding to an interval between two consecutive reference addresses may have a size of 8BYTES.

FIG. 12 shows a method of allocating cache lines when the start address is not any one of the plurality of reference addresses. If the start address is one of the plurality of reference addresses, the cache memory 240 may divide the second command data CMD_DATA2 in the 8BYTE unit from a first reference address REF_ADDR1. That is, the cache memory 240 may generate divided command data by dividing the second command data CMD_DATA2 in the 8BYTE unit from the (2_1)-th divided command data CMD_DATA2_1 and allocate the divided command data to each cache line having the size of 8BYTE.

However, as shown in FIG. 12, since the start address and the end address of the second command data CMD_DATA2 is not any one of the plurality of reference addresses including the first to fifth reference addresses REF_ADDR1 to REF_ADDR5, the cache memory 240 may generate divided command data corresponding to the start address and the second reference address REF_ADDR2, the divided command data starting from a reference address following the start address, i.e., the second reference address REF_ADDR2 among the first to fifth reference addresses REF_ADDR1 to REF_ADDR5, by dividing the second command data CMD_DATA2.

Thereafter, the cache memory 240 may divide the second command data CMD_DATA2 in the 8BYTE unit corresponding to the size of the reference cache line. That is, the cache memory 240 may allocate the (2_1)-th divided command data CMD_DATA2_1 in a 6BYTE unit corresponding to a size from the start address to the second reference address REF_ADDR2, and then divide the second command data CMD_DATA2 from the (2_2)-th divided command data CMD_DATA2_2 in the 8BYTE unit which is the size of the reference cache line.

Specifically, the cache memory 240 may divide the second command data CMD_DATA2 into the (2_2)-th divided command data CMD_DATA2_2 corresponding to data between the second and third reference addresses REF_ADDR2 and REF_ADDR3, the (2_3)-th divided command data CMD_DATA2_3 corresponding to data between the third and fourth reference addresses REF_ADDR3 and REF_ADDR4, and the (2_4)-th divided command data CMD_DATA2_4 corresponding to data between the fourth reference addresses REF_ADDR4 and the end address. That is, because the end address is not be any one of the first to fifth reference addresses REF_ADDR1 to REF_ADDR5, the (2_4)-th divided command data CMD_DATA2_4 is allocated corresponding to data between the fourth reference addresses REF_ADDR4 and the end address.

As a result, since the size of the second command data CMD_DATA2 is 24BYTES, the (2_1)-th divided command data CMD_DATA2_1 may be allocated to have 6BYTES, each of the (2_1)-th and (2_2)-th divided command data CMD_DATA2_1 and CMD_DATA2_2 may be allocated to have 8BYTES, and the (2_4)-th divided command data CMD_DATA2_4 may be allocated to have 2BYTES. Therefore, the second command data CMD_DATA2 divided into four may be stored in the cache memory 240 using differently allocated cache lines.

Furthermore, since the (2_4)-th divided command data CMD_DATA2_4 is a command positioned at a last portion of the second command data CMD_DATA2 and the size thereof is less than 8BYTES, new command data is highly likely to be input thereafter. That is, the (2_4)-th divided command data CMD_DATA2_4 may have the spatial locality. Therefore, the (2_4)-th divided command data CMD_DATA2_4 may be cached in the cache memory 240 even though the (2_4)-th divided command data CMD_DATA2_4 does not have 8BYTES.

Figure 13:
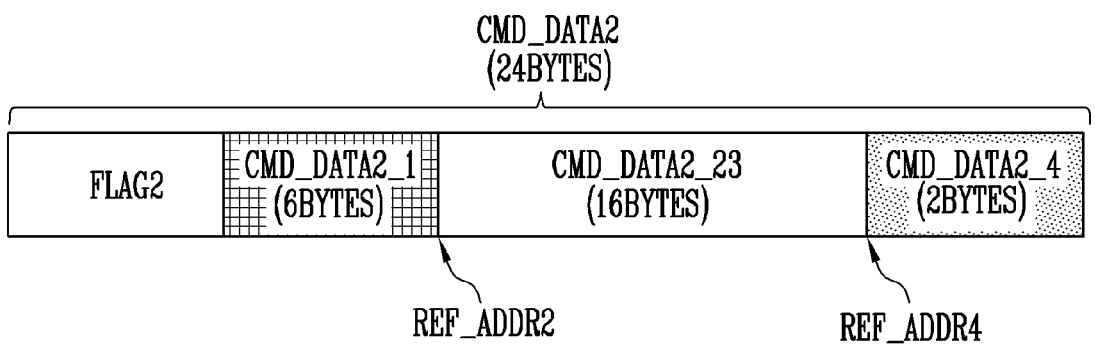
FIG. 13 is a diagram illustrating another method of allocating caches line when the cache lines are not evenly allocated.

FIG. 13 is a diagram illustrating another method of allocating cache lines when the cache lines are not evenly allocated.

FIG. 13 shows a method of dividing the second command data CMD_DATA2 of FIG. 12 and allocating the divided second command data CMD_DATA2 to the cache lines. A description of the content repetitive to that of FIG. 12 will be omitted hereinafter.

In an embodiment, the second command data CMD_DATA2 may include the second flag FLAG2 and the (2_1)-th to (2_4)-th divided command data CMD_DATA2_1 to CMD_DATA2_4. In addition, the size of the second command data CMD_DATA2 may be 24BYTES, and the start address and the end address of the second command data CMD_DATA2 may not be any one of the first to fifth reference addresses REF_ADDR1 to REF_ADDR5. At this time, a size of command data corresponding to an interval between two consecutive reference addresses among the first to fifth reference addresses REF_ADDR1 to REF_ADDR5 may be 8BYTES.

Therefore, the cache memory 240 of FIG. 9 may allocate the (2_1)-th divided command data CMD_DATA2_1 having 6BYTES to a cache line corresponding to an interval between the start address of the second command data CMD_DATA2 and the second reference address REF_ADDR2 following the start address among the first to fifth reference addresses REF_ADDR1 to REF_ADDR5, and then divide the second command data CMD_DATA2 from the (2_2)-th divided command data CMD_DATA2_2 in the 8BYTE unit corresponding to the size of the reference cache line.

However, among the divided command data starting from a reference address following the second reference address REF_ADDR2, command data except for the divided command data positioned at the last portion may not be divided to have 8BYTES. For example, the command data corresponding to the second reference address REF_ADDR2 and the fourth reference address REF_ADDR4 may not be divided in the 8 BYTE unit.

Therefore, (2_23)-th divided command data CMD_DATA2_23, which is command data corresponding to an interval between the second reference address REF_ADDR2 and the fourth reference address REF_ADDR4, may not be sub-divided and may be output to the cache memory 240 with a size of 16BYTES.

As a result, since the size of the second command data CMD_DATA2 is 24BYTES, the (2_1)-th divided command data CMD_DATA2_1 may be allocated to have 6BYTES, the (2_23)-th divided command data CMD_DATA2_23 may be allocated to have 16BYTES, and the (2_4)-th divided command data CMD_DATA2_4 may be allocated to have 2BYTES. Therefore, the second command data CMD_DATA2 may be divided into three divided commands, but only the (2_1)-th divided command data CMD_DATA2_1 and the (2_4)-th divided command data CMD_DATA2_4 may be cached in the cache memory 240 using differently allocated cache lines.

In an embodiment, since the (2_4)-th divided command data CMD_DATA2_4 corresponding to an interval between the fourth reference address REF_ADDR4 and the end address is the divided command data positioned at the last portion of the second command data CMD_DATA2, new command data is highly likely to be input to follow the (2_4)-th divided command data CMD_DATA2_4. Because the end address is not be any one of the first to fifth reference addresses REF_ADDR1 to REF_ADDR5, the (2_4)-th divided command data CMD_DATA2_4 is allocated corresponding to data between the fourth reference addresses REF_ADDR4 and the end address. That is, the (2_4)-th divided command data CMD_DATA2_4 may have the spatial locality which is spatial proximity. Therefore, the (2_4)-th divided command data CMD_DATA2_4 may be cached in the cache memory 240 even though the (2_4)-th divided command data CMD_DATA2_4 does not have 8BYTES.

FIG. 14 is a diagram illustrating an operation of the memory controller 200 of FIG. 1 according to an embodiment of the present disclosure. The operation of FIG. 14 will be described with reference to FIG. 1.

Referring to FIG. 14, in step S1401, command data may be output. Here, the command data may be data for a command corresponding to a request received from the host 300, and may be output from the central processor 210 or the DMA controller 220 in the memory controller 200.

In step S1403, the memory controller 200 may determine a position where the command data is output and a position where the command data is stored. The position where the command data is stored may mean a position of a storage region in the memory buffer 250 included in the memory controller 200.

For example, the memory controller 200 may determine whether the command data is output from the central processor 210 or the DMA controller 220 in the memory controller 200. In addition, the memory controller 200 may determine a start point and an end point of the position of the storage region where the command data is stored by checking a flag included in the command data. At this time, the flag may include information on the position of the storage region in the memory buffer 250 in which the command data is stored.

In step S1405, cache lines for caching the command data may be allocated based on the position where the command data is output and the flag included in the command data.

For example, since a size of the command data is 4BYTES when the command data is output from the central processor 210, the command data does not exceed 8BYTES, which is the size of the reference cache line, and thus it is not necessary to allocate separate cache lines for the command data.

However, since the size of the command data varies when the command data is output from the DMA controller 220, cache lines may be differently allocated based on the flag included in the command data. At this time, the memory controller 200 may allocate the cache lines according to whether a start address of the command data is one of reference addresses of the memory buffer 250 in which the command data is stored.

In step S1407, when the cache lines for caching the command data are allocated, the command data may be cached in the cache memory 240 through the allocated cache lines. When a storage space for the command data is secured in the cache memory 240, all received command data may be stored in the cache memory 240. However, when a storage space for map data is not secured in the cache memory 240, the command data received through the cache lines may be stored in the cache memory 240 by replacing command data having a relatively low locality, among command data stored in the cache memory 240, with command data having a relatively high locality.

FIG. 15 is a diagram illustrating a memory controller 1000, which corresponds to the memory controller 200 of FIG. 1, according to another embodiment of the present disclosure.

The memory controller 1000 is connected to the host 300 of FIG. 1 and the memory device 100 of FIG. 1. The memory controller 1000 is configured to access the memory device 100 in response to a request from the host 300. For example, the memory controller 1000 is configured to control write, read, erase, and background operations of the memory device 100. The memory controller 1000 is configured to provide an interface between the memory device 100 and the host 300. The memory controller 1000 is configured to drive firmware for controlling the memory device 100.

Referring to FIG. 15, the memory controller 1000 may include a processor 1010, a memory buffer 1020, an error correction circuit (ECC) 1030, a host interface 1040, a buffer controller (or buffer control circuit) 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with the host 300 through the host interface 1040 and communicate with the memory device 100 through the memory interface 1060. In addition, the processor 1010 may communicate with the memory buffer 1020 through the buffer controller 1050. The processor 1010 may control an operation of the storage device 50 of FIG. 1 using the memory buffer 1020 as an operation memory, a cache memory, or a buffer memory.

The processor 1010 may perform a function of a flash translation layer (FTL). The processor 1010 may translate a LBA provided by the host 300 into a PBA through the FTL. The FTL may receive the LBA by using a mapping table and translate the LBA into the PBA. An address mapping method of the flash translation layer may include a plurality of mapping methods according to a mapping unit. A representative address mapping method includes a page mapping method, a block mapping method, and a hybrid mapping method.

The processor 1010 is configured to randomize data received from the host 300. For example, the processor 1010 may randomize the data received from the host 300 using a randomizing seed. The randomized data is provided to the memory device 100 as data to be stored and is programmed to a memory cell array of the memory device 100.

The processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction circuit 1030 may perform error correction. The error correction circuit 1030 may perform error correction encoding (ECC encoding) on data that is to be written to the memory device 100 through memory interface 1060. The error correction encoded data may be transferred to the memory device 100 through the memory interface 1060. The error correction circuit 1030 may perform error correction decoding (ECC decoding) on data that is received from the memory device 100 through the memory interface 1060. In another embodiment, the error correction circuit 1030 may be included in the memory interface 1060 as a component of the memory interface 1060.

The host interface 1040 is configured to communicate with the host 300 under the control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device 100 under the control of the processor 1010. The memory interface 1060 may communicate a command, an address, and data with the memory device 100 through a channel.

In another embodiment, the memory controller 1000 may not include the memory buffer 1020 and the buffer controller 1050 therein.

In an embodiment, the processor 1010 may control the operation of the memory controller 1000 using codes. The processor 1010 may load the codes from a non-volatile memory device (for example, a read only memory) provided inside the memory controller 1000. In another embodiment, the processor 1010 may load the codes from the memory device 100 through the memory interface 1060.

The bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error correction circuit 1030, and the memory interface 1060. The control bus may be connected to the host interface 1040, the processor 1010, the buffer controller 1050, the memory buffer 1020, and the memory interface 1060.

Figure 16:
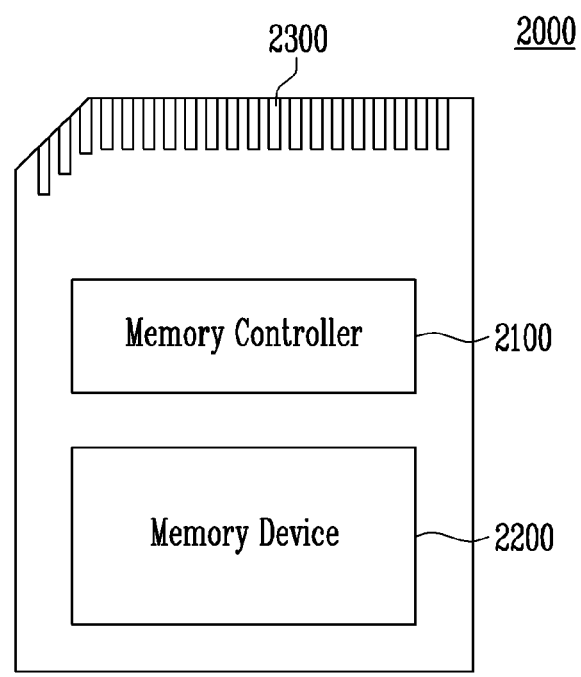
FIG. 16 is a block diagram illustrating a memory card system to which the storage device according to an embodiment of the present disclosure is applied.

FIG. 16 is a block diagram illustrating a memory card system 2000 to which the storage device according to an embodiment of the present disclosure is applied.

Referring to FIG. 16, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may correspond to the memory device 100 of FIG. 1 described with reference to FIG. 2.

The memory controller 2100 may include components such as a random access memory (RAM), a processor, a host interface, a memory interface, and an error correction circuit.

The memory controller 2100 may communicate with an external device, e.g., the host, through the connector 2300. The memory controller 2100 may communicate with the external device according to a specific communication standard. As an example, the memory controller 2100 is configured to communicate with the external device through the use of at least one of various communication standards such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. As an example, the connector 2300 may be defined by at least one of the various communication standards described above.

The memory device 2200 may be implemented as one or more of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), and a universal flash storage (UFS).

Figure 17:
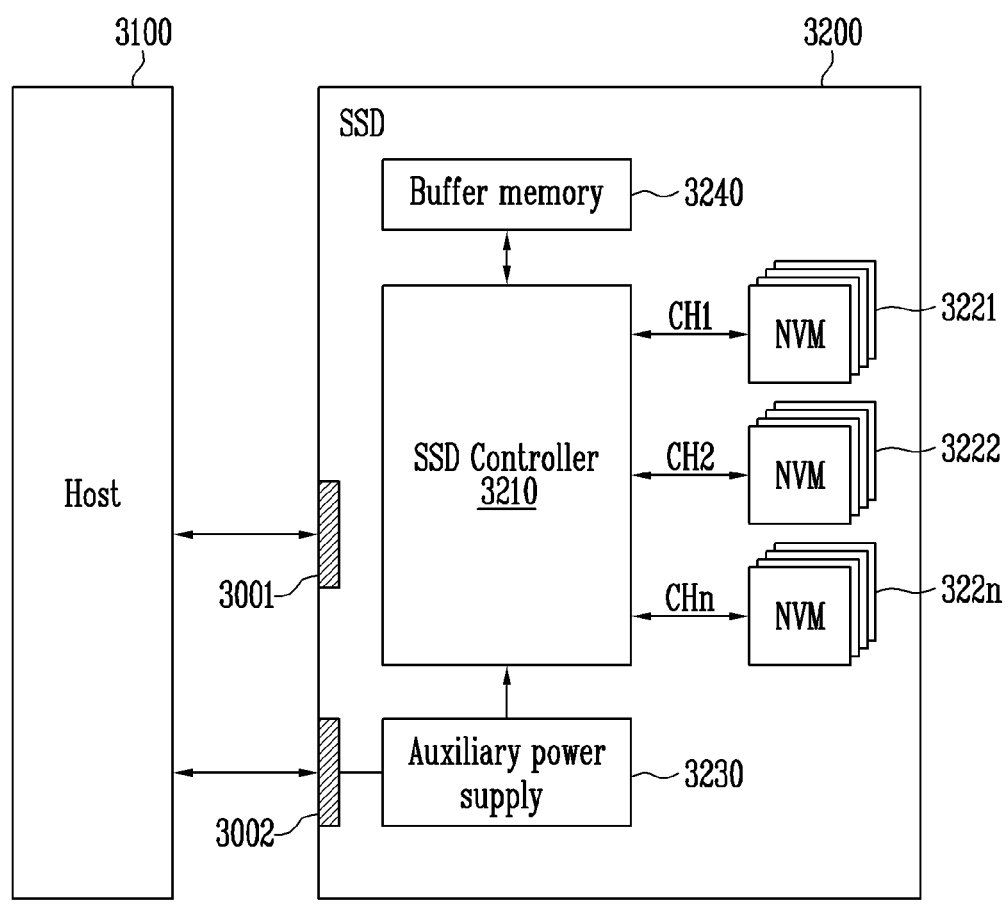
FIG. 17 is a block diagram exemplary illustrating a solid state drive (SSD) system to which the storage device according to an embodiment of the present disclosure is applied.

FIG. 17 is a block diagram exemplary illustrating a solid state drive (SSD) system 3000 to which the storage device according to an embodiment of the present disclosure is applied.

Referring to FIG. 17, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform a function of the memory controller 200 of FIG. 1 described with reference to FIG. 1.

The SSD controller 3210 may control the plurality of flash memories 3221 to 322n in response to the signal SIG received from the host 3100. The signal SIG may be signals depending on an interface between the host 3100 and the SSD 3200. For example, the signal SIG may be a signal defined by at least one of interfaces such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and charge power therein. The auxiliary power device 3230 may provide auxiliary power to the SSD 3200 when the power supply from the host 3100 is not smooth. The auxiliary power device 3230 may be positioned in the SSD 3200 or may be positioned outside the SSD 3200. For example, the auxiliary power device 3230 may be positioned on a main board and may provide the auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, a GRAM, or the like, or a non-volatile memory such as an FRAM, a ReRAM, an STT-MRAM, a PRAM, or the like.

Figure 18:
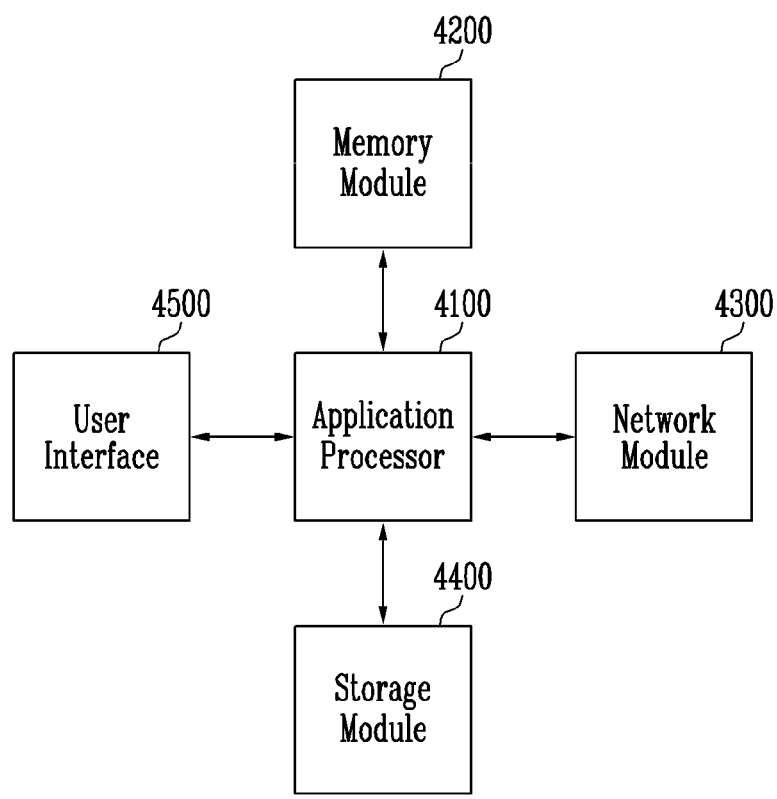
FIG. 18 is a block diagram illustrating a user system to which the storage device according to an embodiment of the present disclosure is applied.

FIG. 18 is a block diagram illustrating a user system 4000 to which the storage device according to an embodiment of the present disclosure is applied.

Referring to FIG. 18, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, an LPDDR3 SDRAM, or the like, or a non-volatile random access memory, such as a PRAM, a ReRAM, an MRAM, an FRAM, or the like. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, WI-FI, or the like. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, a three-dimensional NAND flash, or the like. For example, the storage module 4400 may be provided as a removable storage device (removable drive), such as a memory card, an external drive of the user system 4000, or the like.

For example, the storage module 4400 may include a plurality of non-volatile memory devices, and the plurality of non-volatile memory devices may operate like the memory device 100 described with reference to FIGS. 2 and 3. Therefore, the storage module 4400 may operate like the storage device 50 described with reference to FIG. 1.

The user interface 4500 may include interfaces for inputting data or an instruction to the application processor 4100 or for outputting data to an external device. For example, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 4500 may include one or more of user output interfaces such as a liquid crystal display (LCD), an organic light emitting diode (OLED) display device, an active matrix OLED (AMOLED) display device, an LED, a speaker, a monitor, and so on.

Although various embodiments have been described for illustrative purposes, it will be apparent to those skilled in the art that various changes and modifications may be made without departing from the spirit and scope of the disclosure as defined in the following claims.

What is claimed is:

1. A memory controller comprising:
   a memory buffer configured to store command data corresponding to a request received from a host; and
   a cache memory configured to cache the command data,
   wherein the cache memory divides the command data and allocates divided command data to cache lines, based on reference addresses of the memory buffer and a flag, the flag being included in the command data and including a start address and an end address of a storage region in the memory buffer in which the command data is stored, and
   wherein when the start address is an address other than the reference addresses, the cache memory:
      obtains first divided command data corresponding to a first interval between the start address and a first reference address, which is a next address of the start address, among the reference addresses, the first divided command data being a first part of the command data, and
      obtains second divided command data corresponding to a second interval between the first reference address and a second reference address, which is a next address of the first reference address, among the reference addresses, the second divided command data being a second part of the command data.

2. The memory controller of claim 1, further comprising:
   a central processor configured to generate a command corresponding to the request and output command data corresponding to the command; and
   a direct memory access (DMA) controller configured to communicate with a memory device so that an operation corresponding to the request is performed by the memory device without intervention of the central processor.

3. The memory controller of claim 2, wherein the cache memory caches the command data without allocating the divided command data to the cache lines when the command data is output from the central processor.

4. The memory controller of claim 2, wherein the cache memory allocates the divided command data to the cache lines based on the flag included in the command data when the command data is output from the DMA controller.

5. The memory controller of claim 1, wherein the cache memory determines a size of the command data based on the start address and the end address.

6. The memory controller of claim 1, wherein the cache memory obtains third divided command data corresponding to a third interval between a third reference address and the end address, the third reference address being a previous address of the end address among the reference addresses.

7. A method of operating a memory controller including a memory buffer and a cache memory, the method comprising:
- storing command data corresponding to a request received from a host in the memory buffer; and
- caching the command data in the cache memory,
- wherein the caching comprises dividing the command data and allocating divided command data to cache lines, based on reference addresses of the memory buffer and a flag, the flag being included in the command data and including a start address and an end address of a storage region in the memory buffer in which the command data is stored, and
- wherein the allocating of the divided command data to the cache lines comprises:
  - obtaining, in response to the start address that is an address other than the reference addresses, first divided command data corresponding to a first interval between the start address and a first reference address, which is a next address of the start address, among the reference addresses, the first divided command data being a first part of the command data; and
  - obtaining second divided command data corresponding to a second interval between the first reference address and a second reference address, which is a next address of the first reference address, among the reference addresses, the second divided command data being a second part of the command data.

8. The method of claim 7, wherein when the memory controller further comprises a central processor and a direct memory access (DMA) controller, the central processor configured to generate a command corresponding to the request and output command data corresponding to the command, the DMA controller configured to communicate with a memory device so that an operation corresponding to the request is performed by the memory device without intervention of the central processor,
- the caching further comprises determining whether a component that outputs the command data is the central processor or the DMA controller.

9. The method of claim 8, wherein the caching comprises caching the command data without the allocating of the divided command data to the cache lines when the command data is output from the central processor.

10. The method of claim 8, wherein the caching comprises caching the command data by allocating the divided command data to the cache lines based on the flag included in the command data when the command data is output from the DMA controller.

11. The method of claim 7, wherein the allocating of the divided command data to the cache lines further comprises determining a size of the command data based on the start address and the end address.

12. The method of claim 7, wherein the allocating of the divided command data to the cache lines further comprises obtaining third divided command data corresponding to a third interval between a third reference address and the end address, the third reference address being a previous address of the end address among the reference addresses.

* * * * *